Nov. 6, 1934.          L. P. HYNES          1,979,883
                       ELECTRIC HEATER
                    Filed Nov. 12, 1931     2 Sheets-Sheet 2
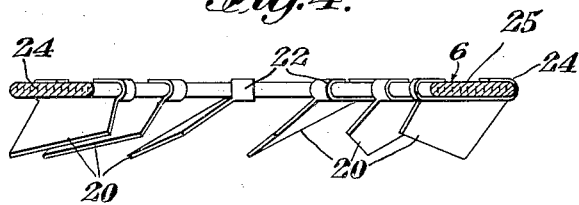
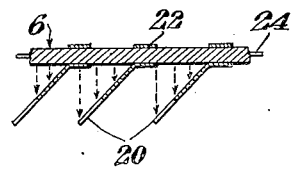
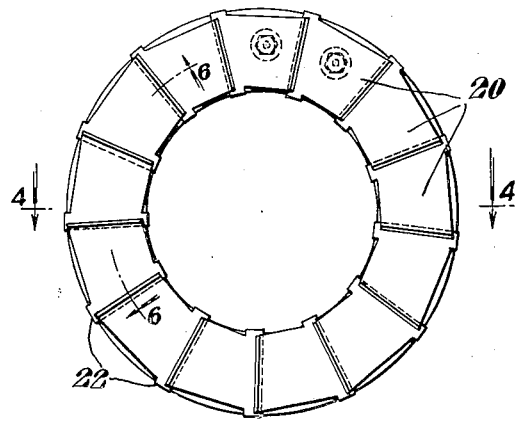
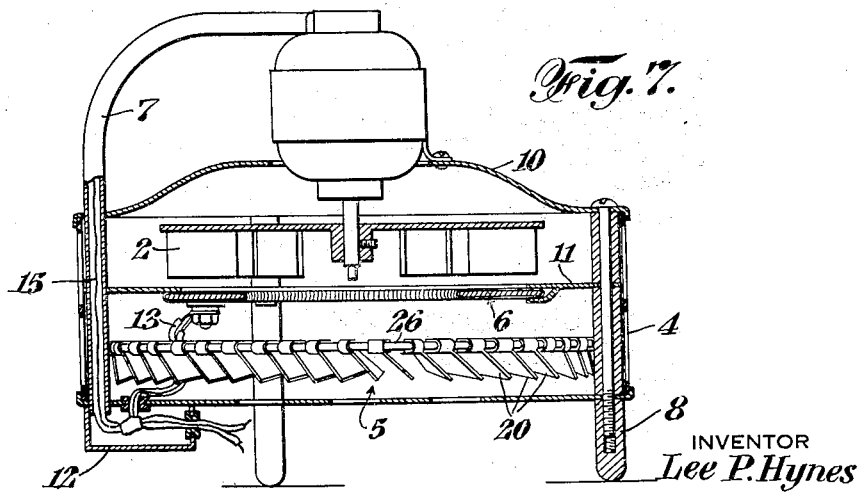
INVENTOR
*Lee P. Hynes*
BY *E. M. Bentley*
ATTORNEY Patented Nov. 6, 1934

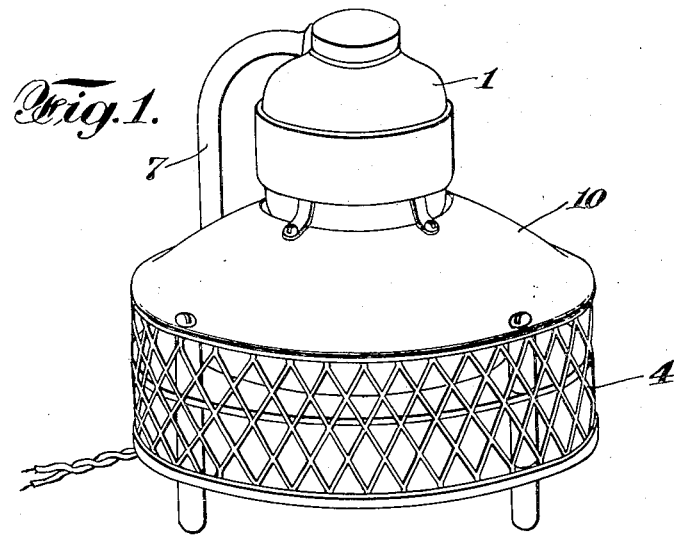
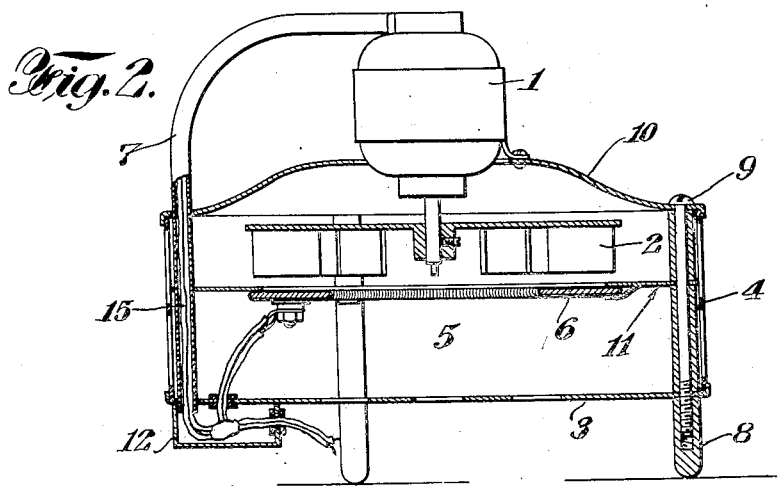
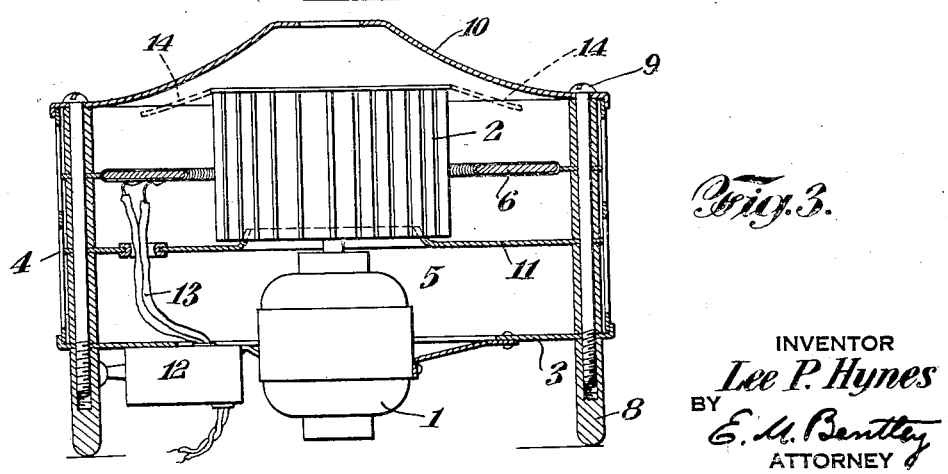

1,979,883

UNITED STATES PATENT OFFICE 1,979,883

ELECTRIC HEATER

Lee P. Hynes, Philadelphia, Pa.

Application November 12, 1931, Serial No. 574,633

39 Claims. (Cl. 219—39)

For a detailed description of the present form of my invention, reference may be had to the following specification and to the accompanying drawings forming a part thereof, wherein Fig. 1 shows my heater;
Fig. 2 is a vertical section thereof;
Fig. 3 is a modification;
Figs. 4-7 show the radiating fins and the principle thereof.

My present heater is of a type especially designed to utilize to advantage the radiant heat in addition to the usual conducted heat.

In principle it is adapted to have the radiant heat directed into a metallic surface from which it will be taken up, by the impingement on said surface, of the currents of air. These air currents, are thereby enabled to receive it indirectly from a surface medium which has absorbed said radiant heat and been thereby raised in temperature. In practice I am enabled, by this expedient, to not only deliver a hotter air current from my heater, but also to keep a lower temperature in the apparatus itself, thus utilizing a larger percentage of the heating energy.

The heater which I show herein, as a means for embodying the principle aforesaid, is of the type in which the heating element forms the wall of the enclosure, or a part of said wall, while a blower within the casing directs an air current over the walls or over surfaces that receive the radiant heat from said heating element. The term "wall" is to be taken broadly as inclusive of any metal surface that either gives out or receives radiant heat within the compass of the air-swept space within the heater. This air current also passes over the heating element itself and receives therefrom the conducted heat, in addition to the radiant heat which it receives indirectly, as above stated.

The heater I show is not, ordinarily, a large one being designed chiefly for household use, and placed directly on the floor of the apartment to be heated. The advantage of this location of the heater on the floor, is that in many cases, as in offices and ticket selling booths, it is the floor which, in prior heating methods, remains cold. If the heater is located in the warmer upper portion of the room, it merely takes in the already heated air and delivers it, at a somewhat higher temperature, to the same warm part of the room, usually in a horizontal direction. This leaves the floor with little or no heat. But, with my floor-located heater, the hottest air is delivered at approximately the floor level, being directed out from the entire periphery of the heater on all sides and preferably directed slightly downward.

As appears in Figs. 1 and 2, the motor shaft is vertical, and the motor 1 is mounted on the outside of and above the conical top 10 of the heater casing. The fan, which is of the multi-bladed type is secured to the lower end of the shaft and rotates just above a horizontal, annular partition wall 11. Below wall 11 is a compartment 5 and below said compartment is the floor 3. The peripheral casing 4 is in the form of an open grid through which the air can pass freely, entering into the said compartment 5 below the partition 11 and emerging above said partition. The whole is supported on legs 8 and the conical cover is secured by screws 9.

The heating element 6 is of a flat, wafer-like, annular form and is secured around the inner edge of the aforesaid annular partition 11. The lead wire 13 passes to the heater 6 directly from the junction box 12 under the floor 3, and the branch lead 15 to the motor 1 passes up from the junction box 12 through a curved tube 7 to the top of the motor. This tube 7 thus provides a convenient handle for lifting the heater.

The air current, entering on all sides through grid 4 into compartment 5, passes up through the central opening in the aforesaid annular heating element 6, after first sweeping along the floor 3 and the under side of element 6 mounted on partition 11, and thence flows radially outward to emerge through the upper part of grid 4, sweeping in its outward course over the top surface of heating element 6 and through the blades of the rotating fan 2. A portion of the air also enters through the opening in top 10 around the motor 1 and joins the above-described current at the fan 2.

The aforesaid air currents will obviously receive the heat that resides in the heating element 6 and in the heater casing. The heating element, because of its thinness, has but a small mass capable of heat storage; its temperature-differential, or gradient, is low, but such heat as may be stored therein, and in the adjacent walls, is given up to the air current which sweeps over them radially and evenly and also over the rotating blades of fan 2.

But there is, in addition, a large component of radiant heat which is not absorbed by the air current directly. From the heating element 6, this radiant heat passes upward into fan 2 and downward into the floor 3. This radiant heat is absorbed by the metallic fan 2 and the metal floor 3 which are thereby made much hotter than they would be made by the conducted heat which they receive from the heating element 6. The frictional contact of the flowing air with the rotating fan 2 and with the floor 3 constitutes an effective means of transferring to the air current all the heat which the fan and the floor contain. Thereby the radiant heat is ultimately imparted to the air current although the air current can not absorb said radiant heat directly.

By the arrangement above described, I obtain in practice a comparatively high heat in the air current and a comparatively low heat in the metal parts of the apparatus.

I will next refer to Figs. 4–7 which illustrate a means for increasing this mode of getting the radiant heat into the air current. In brief, I provide the heater element 6, also other appropriate parts of the casing, with fins 20 which stand at an angle to the surface to which they are attached and may also be curved, whereby the radiant heat which passes out as indicated by dotted lines in Fig. 6, in straight lines from the said surface is intercepted and absorbed by the fins. These fins also receive, by conduction, such heat as may reside in the metal wall from which they project, but, in addition, they also receive the projected radiant heat and hence are that much hotter than they would be if they received the conducted heat alone. Over these fins 20 and over the adjacent surfaces, the air current flows and, by its frictional impact thereon, gathers into itself all of the heat therein both the conducted and the radiated parts thereof. This expedient adds materially to the extent of heated metallic surface that is swept by the air current. It also adds materially to the reduction in temperature of the parts so swept by the air current. Thereby I gain, as aforesaid, a hotter air outflow and a lower temperature of the heater parts and also a higher percentage of efficiency.

In Fig. 4 the inclined fins 20 are attached to the metal sheath that encloses the wires of the heater element 6, the wires themselves being surrounded by an insulating filling within the metal casing. The fins 20 may be welded to the metal casing, or, as shown in Fig. 4, they may have at the base a metal loop 22 which surrounds the metal casing that forms the enclosure of the annular heater 6. These fins 20 stand at an angle to the metal surface from which they project, so as to intercept or cut off the radiation from said surface. They also stand radially with respect to that surface, which is annular, and the air currents, being directed over that surface in radial lines pass between the fins 20 in a radial direction with respect to the annulus of heater 6. In Fig. 4 I have indicated, by dotted lines, the flow of radiated heat to the fins and also in Fig. 5. In Fig. 5 I have shown in section and in Fig. 6 in plan the heater element 6 when they are thus provided with radiant-heat receiving fins. In Fig. 7 I have shown, in the space 5, below the heater, an annular metal wall 21 extending horizontally across space 5 and provided with radiant-heat receiving fins that are like those attached in Fig. 5 to the heater element 6. This metal wall 21 will receive the radiant heat from element 6 above it and will also be swept by the air currents that sweep through the space 5.

In Fig. 3 I have shown a variant of the form appearing in Fig. 2. This is to illustrate the capacity for change in form, though not in principle, in the application of my invention. In Fig. 3 the motor is reversed in position, being mounted on the floor plate 3, but its shaft remains vertical, and its air delivery is radially outward in all directions. The blower wheel of Fig. 3 is of the so-called "sirocco" type but still of the multibladed kind, the blades having a greater width but lesser radius than in the wheel of Fig. 2. In Fig. 3 a special partition 11 divides the compartment 5 from the compartment above which contains the fan wheel, and the central airway in this partition is slightly flanged around its periphery upwardly to facilitate the entry of air into the fan wheel 2. The heating element 6 is located in the upper compartment, about midway of the height of the fan wheel, whereby the air outflow from the wheel is split to sweep over both the top and bottom surfaces of the heater element. The radiant heat from the heater 6 goes up to the conical top plate 10 and down to the partition plate 11. I have also shown in dotted lines a special plate 14 projecting outward from the fan wheel which plate may receive the radiated heat instead of the top plate 11. This plate also performs the additional functions of a shield to prevent overheating of the top plate 10. In the forms of the invention illustrated in Figures 2 and 7, the imperforate back plate which carries the blades of the fan performs the same functions, namely that of a radiant heat shield which not only protects the nearest adjacent end wall but also provides a medium for imparting additional heat to the air current.

To either of the forms shown in Figs. 2 or 3 the expedient of the radiant-heat receiving fins, illustrated in Figs. 1–7 may be applied in many obvious ways that require no illustration.

What I claim as new and desire to secure by Letters Patent is:

1. In an electric heater, an electrically heated wall, a second wall spaced therefrom, said walls being so arranged that the electrically heated wall will direct radiant heat to the second wall, and means for causing a current of air to take heat conductively from both of said walls by sweeping radially over the surfaces thereof.

2. In a heater of the character described, a casing, means for producing a radial air current within said casing, a portion of the interior surface of the casing being arranged to be swept by said air current, a second surface arranged in spaced relation with respect to the first mentioned surface, and means for electrically heating said second surface, the said surfaces being so positioned that the radial air current will sweep over the exposed areas thereof, so that radiant heat is transmitted to the air swept surface and transmitted by conduction to the radial air current passing over said air swept surface.

3. In a heater of the character described, an electric heater element, means for directing a current of air radially over said heater element, so that said air current is caused to take up heat conductively therefrom, a member spaced from the heater element and so positioned that radiant heat from the heater element will be directed against it, said member also lying in the path of said radial air current, so that the air current will also take up heat conductively therefrom.

4. A heater of the character described comprising a chamber having an interiorly located air-directing wall provided with a flat exposed electrically-heated surface, means providing a second surface located in radiating proximity to said heated surface, and means within said chamber for causing a current of air to take up heat conductively from both of said surfaces.

5. A heater of the character described comprising a chamber having an interiorly located air-directing wall provided with a flat annular electric heater member having its surfaces exposed within said chamber, a second member having a flat surface exposed in said chamber and located in radiating proximity to said heater, and means within said chamber for causing a current of air to take up heat conductively from the surfaces of both members.

6. A heater of the character described comprising a chamber having an interiorly located air-directing wall provided with a flat annular electric heater member exposed within the chamber, a second member having a flat surface located in radiating proximity to said heater member, air impelling means arranged concentrically with respect to the heater member and also positioned in radiating proximity thereto, said heater member, said second member and said air impelling member being so constructed and arranged that a current of air created by said air impelling member will take up heat conductively from all of said members.

7. In an electric heater, a heating element provided with flat fins projected from one surface thereof and in laterally inclined planes with respect to said surface, said fins being so constructed and arranged as to intercept heat radiated from said surface and to transfer it to an outgoing air stream by conduction.

8. In an electric heater, a thin wafer-like heating element, means providing a surface spaced from the heating element and so positioned as to be heated by radiation therefrom, and a blower element, said heater element and said blower element being so constructed and arranged that the blower element will direct a current of air over said heating element and in direct contact therewith, said radiation-heated surface being so positioned that it will also deliver its received radiant heat to said air current by conduction.

9. In an electric heater, a thin wafer-like annular heating element, means providing a surface spaced from the heating element and so positioned as to be heated by radiation therefrom, and a blower element concentric with said heating element, said blower element and said heating element being so constructed and arranged that the blower will direct a current of air over the surfaces of said heating element and in direct contact therewith and also axially through the center of said heating element, said radiation-heated surface being so positioned that it will also deliver its radiant heat to said air current by conduction.

10. In an electric heater, a thin wafer-like annular heating element, means providing a surface spaced from the heating element and so positioned as to be heated by radiation therefrom, and a blower element so positioned with respect to said heating element as to also receive radiant heat therefrom, said heating element and said blower element being so constructed and arranged that the blower element will direct a current of air over said heating element in direct contact therewith, said radiation-heated surface and said blower element being so positioned that they will also deliver their received radiant heat to said air current by conduction.

11. An electric heater comprising a casing formed to direct air currents therethrough, a partition wall dividing said casing into two chambers and having an air passage therethrough, an electric heater, a fan wheel located in one chamber and so positioned as to direct an air current over and in contact with said heater, and a driving motor for the fan located in the other chamber.

12. An electric heater comprising a casing, a partition wall within said casing consisting of a flat annular heater element, said casing having an inlet opening on one side of said heater and an outlet opening on the other side thereof, and a blower so positioned as to direct air currents into contact with and through said heater element from the inlet opening to the outlet opening.

13. An electric heater comprising a circular casing provided with inlet openings and outlet openings, a flat annular heater within said casing, an annular partition wall located within said casing between the inlet openings and the outlet openings and provided with angularly disposed fins so positioned as to intercept radiant heat from said heater, and a fan wheel within said casing and so constructed and arranged as to direct air currents from the inlet openings to the outlet openings and over the surfaces of said heater and said fins.

14. An electric heater comprising a casing provided with inlet openings and outlet openings, an electric heater of annular form located between said inlet and outlet openings, a rotatable shield provided with means for directing a stream of air from the inlet openings to the outlet openings and in contact with said heater, said shield being located adjacent said heater in a position to receive radiant heat therefrom and to conduct it to said air stream.

15. An electric heater comprising a casing provided with inlet openings and outlet openings, a horizontally disposed annular partition located between the inlet and outlet openings and consisting of an annular electric heater, a series of angular fins located in radiating proximity to said heater, and a rotatable shield provided with means for causing an air stream to travel from the inlet to the outlet openings and in contact with said heater and said fins, said shield being located adjacent said heater in a position to receive radiant heat therefrom and to conduct it to said air stream.

16. An electric heater comprising a casing having inlet air openings and outlet air openings, an annular partition located between the inlet and outlet openings and dividing the casing into two chambers, said partition consisting of an electrical heating element, and an electrically driven fan constructed and arranged to direct air currents from the inlet openings to the outlet openings and through the annular opening of the heater partition, said partition and said openings being so relatively positioned that said air currents are caused to travel radially over the surfaces of said partition.

17. An electric heater comprising a casing provided with air inlet openings and air outlet openings, an annular partition located between the inlet and outlet openings and dividing the casing into two chambers, means for electrically heating said partition, a rotatable shield provided with means for directing a stream of air from the inlet openings to the outlet openings and in contact with said heated partition, said shield being located adjacent said heated partition in a position to receive radiant heat therefrom and to conduct it to the air stream, said air-stream-producing means and said heated partition being so constructed and arranged that said air currents are caused to travel radially over the surfaces of said partition.

18. An electric heater comprising a casing provided with a perforated circular wall, an electric heater of annular form located within said casing at a position spaced from the ends thereof so that some of the perforations of said wall are above the heater and other perforations are below the heater, a rotatably mounted vertical shaft within said casing, a radiant-heat-shield carried by said shaft and located adjacent said heater, said shield having fan blower blades projecting toward said heater, said blades being so constructed and arranged as to create an air current radially inward through one set of openings and radially outward through the other set of openings and in contact with said annular heater.

19. An electric heater comprising a casing provided with a perforated circular wall, an electric heater of annular form located within said casing at a position spaced from the ends thereof so that some of the perforations of said wall are above the heater and other perforations are below the heater, a rotatably mounted vertical shaft within said casing extended axially through the opening in the heater, a radiant-heat-shield carried by said shaft and located adjacent said heater, said shield having fan blower blades projecting toward the heater, said blades, said heater and said opening being so constructed and arranged as to create an air current radially inward through one set of openings and radially outward through the other set of openings and in contact with the heater, and also axially through the heater parallel with the axis of rotation of the shaft.

20. In an electric air heater, a motor, a plurality of flat circular partitions having central openings concentric with the motor shaft, said partitions being longitudinally spaced with respect to said axis, means for electrically heating one of said partitions, and a fan carried by the motor shaft and so positioned and arranged with respect to said partitions as to draw air axially through said central openings and cause it to travel radially outward over the heated and conducting surfaces of said partitions.

21. An electric air heater comprising a cylindrical casing having top and bottom walls joined by a perforated side wall, a circular partition located within the casing and spaced from said top and bottom walls, a thin flat circular heater element carried by said partition and having a central opening therein, a fan wheel axially spaced from the heater element so as to receive air through the central opening thereof, and means for rotatably supporting said fan.

22. An electric heater comprising a chamber surrounded by a perforated enclosing wall, a transversely disposed circular partition dividing said chamber into inlet and outlet compartments, a thin flat transversely disposed circular heater element within said chamber, said heater element having an opening therethrough, a motor having its shaft axially disposed with respect to the opening in the heater element, and a fan wheel carried by the motor shaft and positioned and arranged to draw air from one side of the heater element through the opening thereof and to discharge it radially over the surface of the other side of the heater element.

23. In an electric heater, a motor, a centrifugal fan wheel mounted on the shaft of said motor, a flat annular heating member concentric with the axis of rotation of said fan, and flat radial fins projecting from a surface of said heating member at such an angle as to intercept radiant heat therefrom, and so positioned and arranged as to convey conducted and intercepted radiant heat to an air current travelling radially over the heating member.

24. In an electric heater, a flat annular heating member having flat radially disposed surface fins positioned at such an angle as to intercept radiant heat therefrom and so constructed and arranged as to conduct heat from the heating member and also to intercept radiant heat and impart it to an air current flowing radially over said heating member.

25. An electric heater comprising a casing having a perforated peripheral wall, a flat transversely disposed partition wall dividing said casing into an inlet chamber and an outlet chamber, and having an opening therein, a motor having its shaft disposed axially with respect to said partition and its openings, a thin wafer-like annular heating member concentric to the axis of the motor shaft, a centrifugal fan carried by the shaft, said fan being so positioned with respect to the partition wall and heater as to create an air flow radially inward through said casing into the inlet chamber, thence axially through the opening in the partition wall and heater member into the outlet chamber and then radially outward through the perforated casing so that the air stream contacts with both sides of said heating element.

26. In an electric heater, a casing having a top and a bottom connected by a side wall having openings therein, a transversely disposed partition within said casing, a fan mounted to rotate in said casing, an annular flat heater member carried by said partition and concentric with the axis of the fan, and a radiant heat shield carried by said fan in spaced relation with respect to the heater.

27. In an electric heater, a casing having top and bottom walls connected by a perforated side wall, a transversely disposed partition within said casing relatively spaced with respect to the top and bottom walls thereof, a fan mounted to rotate within the casing, an annular flat heater member carried by said partition and concentric with the axis of the fan, and an annular shield carried by the fan and located between the heater and the top wall, said shield being so positioned and arranged as to intercept the radiant heat from the heater element.

28. In an electric heater, a casing having top and bottom walls connected by a perforated side wall, a fan rotatably mounted within said casing, a transversely disposed annular flat heater element supported within said casing and concentric with the axis of the fan, and means providing a radiant heat shield between said heater element and the top wall of the casing.

29. In an electric heater, a casing having a top and bottom connected by a perforated side wall, a transversely disposed partition carrying a centrally disposed annular flat heater member dividing said casing into inlet and outlet chambers, and a fan mounted to rotate within the casing and axially disposed with respect to said heater, said fan having an imperforate heat absorbing member interposed between the heater and the end wall nearest to the fan.

30. In an electric heater, a casing having top and bottom end walls connected by a perforated side wall, said end walls having openings therein, a motor extended through an opening in one of said end walls, a fan carried by the motor shaft, a transverse partition within said casing spaced from the end walls and provided with an annular flat heater member concentric with the axis of the motor shaft, said parts being so constructed and arranged as to create an air flow traveling radially inward through the casing and also axially inward around the motor, thence axially through the opening in said heater and then radially outward through the perforated side wall, so that the air stream contacts with both sides of the heating element.

31. In an electric heater, a casing having relatively spaced inlet and outlet openings, a motor in said casing, annular heating means located within the casing in a position concentric with the axis of the motor shaft and having flat heating surfaces, and a fan carried by said motor shaft, said fan and said heating means being so constructed and relatively arranged as to cause air traveling from the inlet to the outlet to pass axially through the heating means and radially over heated surfaces thereof.

32. In an electric heater, a casing having a top and a bottom connected by a side wall having openings therein, a transversely disposed partition within said casing, an electric motor, a fan driven by said motor and mounted to rotate within said casing, an annular flat heater member carried by said partition and concentric with the axis of the fan, a radiant-heat-shield carried by said fan in spaced relation with respect to the heater, and a second stationary annular partition also concentric with the axis of the fan and spaced between the electric heater member and the motor so as to shield the latter from radiant heat.

33. In an electric heater, a casing having two end walls connected by a side wall having perforations therein, a motor supported by an end wall of said casing, a fan driven by said motor and so positioned as to rotate within the casing, an electrically heated annular partition wall located in the casing and spaced from the end walls, said partition being concentric with the axis of rotation of said fan, means providing a radiant-heat-absorbing surface adjacent to said partition wall, said fan, said casing, said partition wall and said heat-absorbing surface being so constructed and arranged as to cause an air stream to pass radially over both sides of the electrically heated partition and also to pass over said radiant-heat-absorbing surface.

34. In an electric heater, a casing having end walls connected by a perforated side wall, a fan rotatably mounted within said casing, a transversely disposed annular heater element supported within said casing and concentric with the axis of the fan, said heater element being spaced from said end walls, and means providing a radiant-heat-shield between said heater element and a wall of the casing.

35. In an electric heater, a casing having inlet openings and outlet openings, a motor, a fan carried by the motor shaft, an annular heating member located within the casing in a position concentric with the axis of the motor shaft, said fan and said heating means being so constructed and arranged as to cause air travelling from the inlet openings to the outlet openings to pass axially through the annular heating member and radially over the heated surfaces thereof, and means to shield said motor from radiant heat rays emanating from said heating member.

36. In an electric heater, a casing having inlet and outlet openings, a fan mounted to rotate within said casing, a transversely disposed annular flat partition concentric with the axis of the fan, approximately radial fins carried by said annular partition, means for electrically heating said wall and said fins, said fan being so mounted and arranged as to cause an air flow over the exposed surfaces of the annular partition and over the surfaces of said fins, and also through the central opening of said partition, and means for intercepting radiant heat from the partition and to also conduct it to the air stream.

37. In an electric heater, an annular heating element having fin-like extensions on one surface so positioned as to intercept heat radiated from the heating element, said fins being so constructed and arranged as to offer no appreciable interference with free air flow through the heater element and over the surfaces thereof.

38. In an electric heater, a heater element of approximately circular form having an open air passage through its center, and fin-like members projecting from said heater element in such manner as to intercept heat rays emanating from the heater element, said fins being so constructed and arranged as to conduct heat to any air streams passing through the center of the heater element and around the surfaces thereof.

39. In an electric heater, a casing having a cylindrical wall provided with openings therein, an electrically driven fan located within the casing, and an annular flat heating element supported within the casing in such manner as to extend transversely across the same, and so located with respect to the fan that air currents created by the latter are caused to travel radially and axially with respect to the heating element.

LEE P. HYNES.